SQUARING CIRCUIT

Filed April 25, 1967

RAYMOND L. NELSON
INVENTOR.
BY Daniel E. Sragow
Robert W. Hampton
ATTORNEYS

United States Patent Office 3,497,723
Patented Feb. 24, 1970

3,497,723

SQUARING CIRCUIT

Raymond Larter Nelson, Rochester, N.Y., assignor to Eastman Kodak Company, Rochester, N.Y., a corporation of New Jersey Filed Apr. 25, 1967, Ser. No. 633,522
Int. Cl. H03k *17/00*
U.S. Cl. 307—261 6 Claims

ABSTRACT OF THE DISCLOSURE

A squaring circuit which is capable of giving an output of a rectangular wave from an input which is not rectangular and/or has noise components. The circuit provides two functions: (1) a level control having a preset level above which the circuit will trigger, and (2) a duration level during which the pulse must be above the preset level in which to trigger. The circuit gives an output when the input has satisfied both conditions.

BACKGROUND OF THE INVENTION

Field of the invention

This invention relates to circuits for eliminating noise, and more particularly to a circuit which forms a rectangular wave from a waveform having a more complex shape.

Description of the prior art

In many applications it is desirable to provide a signal source which has a very low level but which may be sensitive to extraneous noise. Along with this type of source it is necessary to provide a means for elimination of the noise and a conversion of the complex wave to a rectangular wave.

It is therefore an object of the invention to provide a circuit which is able to have as its input a complex wave with a considerable amount of noise superimposed thereon and process it so that it comes out as a rectangular wave with the noise completely eleminated.

It is a further object of the invention to provide a noise eliminating circuit for rectangular waves which is simple, reliable, and inexpensive.

Other objects and advantages of the invention will be apparent to those skilled in the art by the description which follows.

BRIEF DESCRIPTION OF THE DRAWING

In the detailed description of the preferred embodiment of the invention presented below, reference is made to the accompanying drawings, in which.

DESCRIPTION OF THE PREFERRED EMBODIMENT

Figure 1:
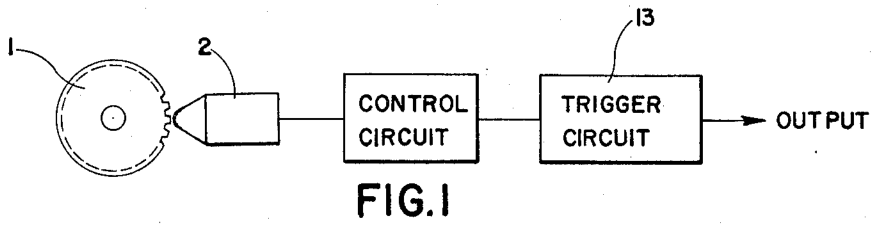
FIG. 1 is a block diagram of a system where the novel control circuit can be used.

With reference to the drawing, and particularly to FIG. 1, there is shown a magnetic pick-up 2 which produces a pulse when the teeth of gear 1 passes in proximity to it. Since the magnetic pick-up 2 must be very sensitive, it is also sensitive to extraneous noise. It therefore produces a wave form as shown in the *a* part of FIG. 3.

Figure 2:
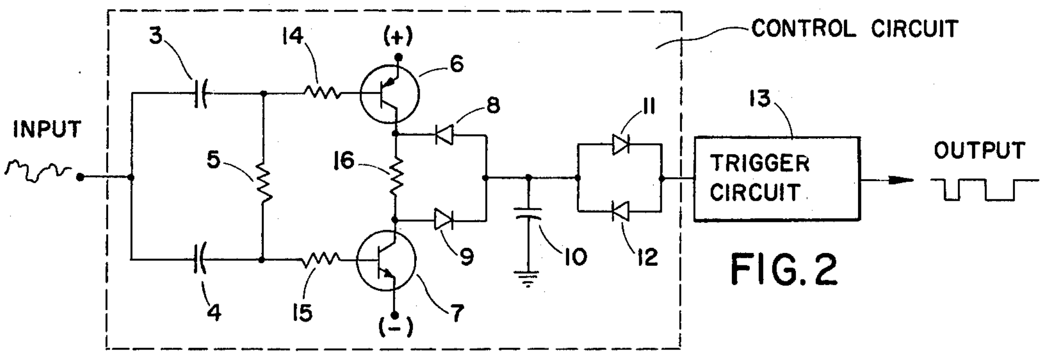
FIG. 2 is a detailed circuit diagram of the novel squar ing circuit.

Referring to FIG. 2, there is shown the control circuit itself. The input is connected to capacitors 3 and 4 which are connected together to the input and have their other ends connected to opposite sides of resistor 5. The opposite ends of capacitors 3 and 4 are also connected through resistors 14 and 15 to the bases of transistors 6 and 7.

Transistor 6 is an PNP type transistor whereas transistor 7 is an NPN type transistor. The collectors of the two transistors are connected together through resistor 16; the emitters of the transistors 6 and 7 are connected to the power supply, the emitter of transistor 6 being connected to the positive terminal of the supply, and the emitter of transistor 7 being connected to the negative terminal of the supply. The collectors of transistors 6 and 7 are connected to oppositely poled diodes 8 and 9 which have their opposite ends connected together. The junction of the two diode 8 and 9 is connected to control capacitor 10 which has its other end grounded. The junction of the diodes 8 and 9 is also connected to another pair of oppositely poled diodes 11 and 12 which are connected in parallel. The opposite ends of diodes 11 and 12 are conencted to a trigger circuit 13 which can be any type of trigger having two stable states, such as a Schmitt trigger or a multivibrator.

The circuit operation will now be explained. The input signal which is a complex wave with a high noise level super-imposed thereon is fed to the left side of capacitors 3 and 4. These capacitors couple the signal through resistors 14 and 15 to transistors 6 and 7. In the absence of an input signal, transistors 6 and 7 are both conducting and are saturated. Diodes 8, 9, 11 and 12 are biased to be non-conducting. Resistors 5, 14 and 15 are proportioned such that transistors 6 and 7 are supplied with enough base current to keep them saturated.

Figure 3:
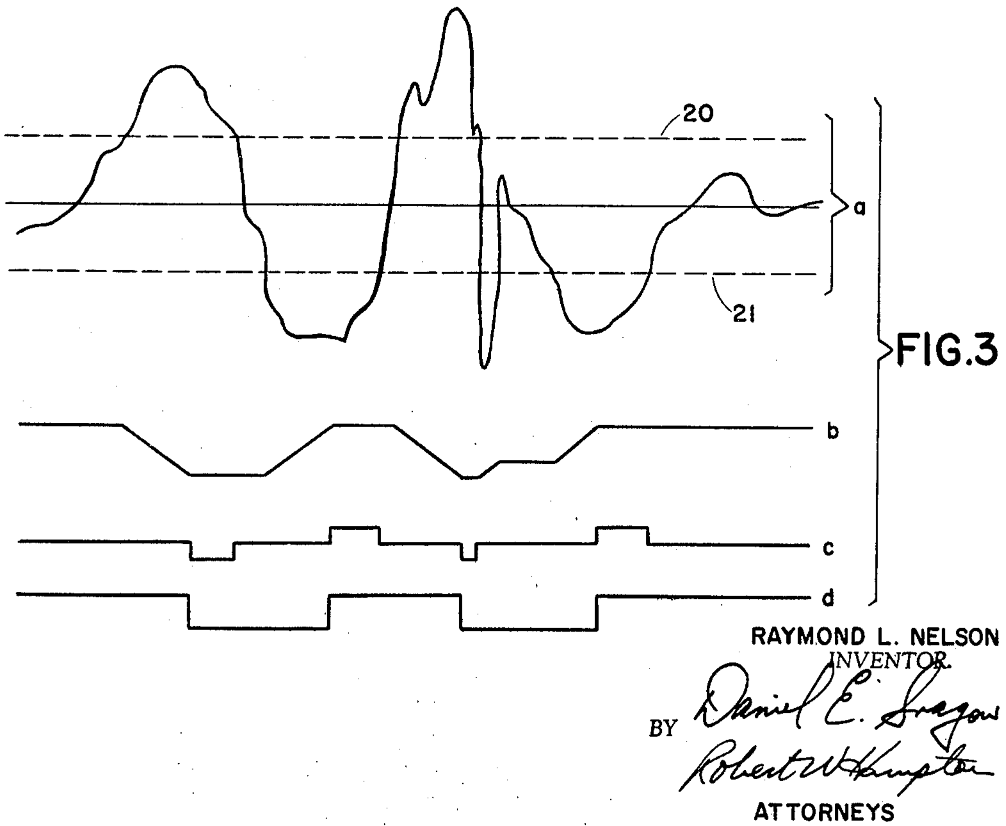
FIG. 3 shows the various wave forms the signal makes as it passes through the squaring circuit. The input wave is shown at *a*; the voltage on the control capacitor is shown at *b*; the trigger circuit input current is shown at *c*; and the circuit output is shown at *d*.

If the signal rises above a predetermined level 20 shown in the *a* portion of FIG. 3, transistor 6 is turned off and capacitor 10 begins to charge through diode 8, resistor 16 and transistor 7. If the signal remains above level 20 for longer than the time necessary to charge capacitor 10, capacitor 10 will reach a negative voltage equal to the forward drop across diode 12. The current drawn by resistor 16 will then flow through diodes 8 and 12 and the trigger circuit input thus causing the trigger circuit to switch states. If the input does not last for the predetermined time, regardless of its amplitude, capacitor 10 will not reach the voltage required to make the diode 12 turn on, and the output will be unaffected. Similarly, if the input does not reach level 20 regardless of how long it may last, transistor 6 will not turn off and the output will not be affected.

In a similar manner, if the input to the squaring circuit goes below level 21, transistor 7 will be turned off thus causing resistor 16 to draw current which will charge capacitor 10 positively through diode 9. If this situation continues for the predetermined time, the current through resistor 16 will flow through diodes 9 and 11 into the trigger circuit 13 causing the output to switch positively. Again the input must exceed level 21 for more than the predetermined time in order to affect the output.

Level 20 is determined by the average voltage drop across resistor 14 and is controlled by adjusting the value of resistor 14. Similarly, level 21 is controlled by adjusting resistor 15. Both levels 20 and 21 can be simultaneously controlled by adjusting resistor 5. The predetermined time is controlled by adjusting resistor 16 and/or the value of capacitor 10. The predetermined time can be made longer or shorter for positive signals than for negative signals simply by making the positive supply voltage on transistor 6 different from the negative supply voltage on transistor 7. This can also be accomplished by placing different resistances in series with diodes 8 and/or 9.

It is not necessary that the input to the squaring circuit be from a magnetic pick-up as shown. Any type of input can be used. Further, the preferred embodiment uses transistors as the switching device. However, it would be obvious to a skilled worker in the art to adapt the circuit for use with vacuum tubes or other switching devices.

While the invention has been described above with respect to a particular embodiment, it will be readily appreciated by those skilled in the art that other modifications and changes may be made without departing from the scope of the invention. The scope of the invention is therefore to be limited only by the appended claims.

I claim:

1. Apparatus responsive to an input signal of irregular waveform to provide an output signal having a substantially rectangular waveform, said apparatus comprising:

(a) first and second electrical switches each having first, second and third electrodes, said first and second electrical switches being operative in a first state to present a relatively low impedance between said second and third electrodes and operative in a second state to present a relatively high impedance between said second and third electrodes, (b) biasing means connected to said first and second electrical switches for disposing normally said first and second electrical switches in their first state, (c) means for applying the input signal to said first electrode of said first electrical switch to dispose said first electrical switch in its second state when the input signal is more positive than a first potential level and for applying the input signal to said second electrical switch to dispose said second electrical switch in its second state when the input signal is more negative than a second potential level, (d) capacitive means, (e) first and second uni-directional conducting means for coupling said capacitive means respectively to first and second electrical switching means, (f) resistance means connected in circuit with said first and second uni-directional conducting means to discharge said capacitive means through either said first or second uni-directional conducting means respectively when either said first or second electrical switching means is disposed in its second state, and (g) circuit means connected to said capacitive means and responsive to signals more positive than a third level to provide a first output signal after a delay greater than a predetermined period of time, said circuit means responsive to signals more negative than a fourth level to produce a second output signal after a delay greater than a predetermined period of time, said first output signal having a different potential than said second output signal, said predetermined period of time being dependent upon the values of said capacitive means and said resistance means.

2. A circuit responsive to an input signal of irregular waveform to provide an output signal having a substantially rectangular waveform, said circuit comprising:

(a) first and second transistors each having base, emitter and collector electrodes, said first and second transistors being operative to an "on" state and to an "off" state, (b) means for normally biasing said first and second transistors to their "on" state, (c) means for applying the input signal to said first transistor to dispose said first transistor in its "off" state when the input signal is more positive than a first potential level and for applying the input signal to said second transistor to dispose said second transistor to its "off" state when the input signal is more negative than a second potential level.

(d) capacitive means, (e) first and second uni-directional conducting means for coupling said capacitive means respectively to said first and second transistors, (f) resistance means connected in circuit with said first and second uni-directional conducting means to discharge said capacitive means through either said first or second uni-directional conducting means respectively when either said first or second transistor is disposed in its "off" state, (g) trigger means responsive to input signals of a first polarity to provide an output signal of a first level and responsive to input signals of a second polarity to provide an output signal of a second level, and (h) third and fourth uni-directional conducting means for coupling said capacitive means to said trigger means to apply input signals of said first and second polarities to said trigger means after a pre-selected period of time, said period of time being dependent upon the values of said resistance means and said capacitive means.

3. A circuit as claimed in claim 2, wherein said resistance means is interconnected between said first and second transistors.

4. A circuit responsive to input signals of complex waveform to provide an output signal having a substantially rectangular waveform, said circuit comprising:

(a) first and second transistors of opposite type, each of said first and second transistors having emitter, base and collector, said first and second transistors having a conductive state and a non-conductive state, (b) means coupled to said emitters of said first and second transistors for normally biasing said first and second transistors to their conductive states, (c) means for applying the input signal to said base of said first transistor to dispose said first transistor in its non-conductive state when the input signal is more positive than a first potential level and for applying the input signal to said base of said second transistor to dispose said second transistor in its non-conductive state when the input signal is more negative than a second potential level, (d) capactive means, (e) resistance means connected to said collectors of said first and second transistors, (f) first and second diodes for respectively coupling said collectors of said first and second transistors to said capacitive means to respectively provide a discharge path through said resistance means when either said first or second transistor is disposed in its non-conductive state, (g) trigger means responsive to input signals of a first polarity to provide an output signal of a first level and responsive to input signals of a second polarity to provide an output signal of a second level, and (h) third and fourth diodes for respectively providing a low conductive path in a first direction and in a second direction from said capacitive means to said trigger means to apply the input signals of first and second polarities to said trigger means after a preselected period of time dependent upon the values of said resistance means and said capacitive means.

5. A circuit as claimed in claim 4, wherein said resistance means takes the form of a resistor interconnected between said collectors of said first and second transistors.

6. A circuit as claimed in claim 4, wherein said means for applying comprises a resistance network disposed from said base of said first transistor to said base of said second transistor and having first and second intermediate points to which the input signal is applied.

References Cited

UNITED STATES PATENTS

| | | | |
|---|---|---|---|
| 3,125,694 | 3/1964 | Palthe | 307—228 |
| 3,336,518 | 8/1967 | Murphy | 328—151 XR |

DONALD D. FORRER, Primary Examiner

J. ZAZWORSKY, Assistant Examiner

U.S. Cl. X.R.

307—235, 268, 294; 328—162